Sept. 2, 1969     P. A. RAGUSA     3,465,172

TRANSIENT SIMULATOR

Filed Dec. 7, 1965

INVENTOR.
PETER A. RAGUSA
BY Harry A. Herbert Jr
Julian L. Siegel
ATTORNEYS

United States Patent Office 3,465,172
Patented Sept. 2, 1969

3,465,172
TRANSIENT SIMULATOR
Peter A. Ragusa, San Jose, Calif., assignor to the United States of America as represented by the Secretary of the Air Force
Filed Dec. 7, 1965, Ser. No. 520,541
Int. Cl. H03k 1/14
U.S. Cl. 307—265                    3 Claims

ABSTRACT OF THE DISCLOSURE

A system for controlling load voltages having a shorting transistor that shorts out a bias, the shorting transistor being controlled by a control transistor atcivated by a switch that controls the voltage at the base of the control transistor through a resistor-capacitor combination for determining its conducting state, the timing of the conducting state being controlled by the values of the resistor-capacitor combination.

---

This invention relates to an apparatus for producing waveforms and more particularly to a transient simulator.

This invention is designed to insert known rectangular pulses on a supply voltage to a load or a system under test. It is a new and basic ideal for obtaining predictable transient voltage on a power supply and is useful as a square wave generator.

It is, therefore, an object of this invention to provide a transient simulator.

It is another object to provide a square wave generator.

It is still another object to provide a square wave generator having a wide range of pulse widths.

It is yet another object to provide a transient simulator using a Zener diode.

These and other advantages, features and objects of the invention will become more apparent from the following description taken in connection with the illustrative embodiment in the accompanying drawing, wherein.

Figure 1:
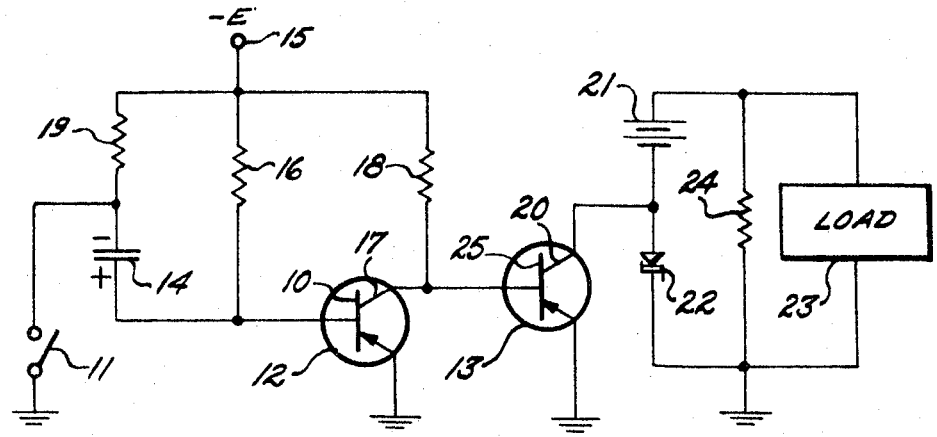
FIGURE 1 shows circuit diagram of a preferred embodiment of the invention.
Figure 2:
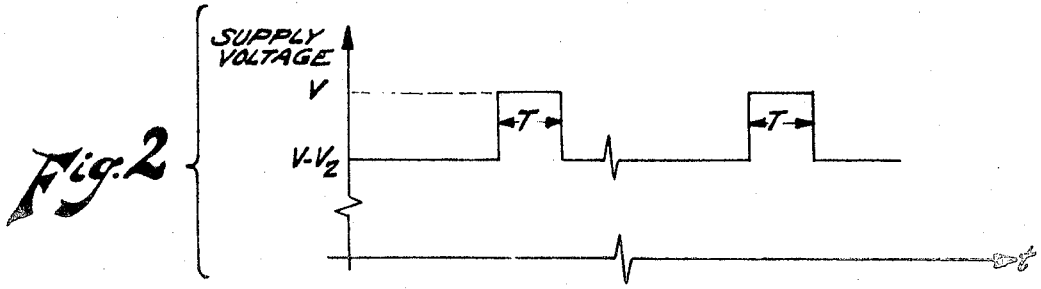
FIGURE 2 shows the resultant waveform produced by the invention.

Referring to FIGURES 1 and 2, with switch 11 open, transistor 12 is conducting and transistor 13 is off. The voltage $V_c$ of capacitor 14 is approximately equal to voltage E of power supply 15. This is the normal mode of operation and as a consequence of the conduction of transistor 13 V—$V_z$ is supplied to load 23 where V is the voltage from D-C potential source 21 and $V_z$ is the voltage drop across Zener diode 22. When switch 11 is closed transistor 12 is turned off for a period of time T which is determined by the values of capacitor 14 and resistor 16. During the time transistor 12 is off, the voltage at collector 17 of transistor 12 turns transistor 13 on and voltage V is delivered to the load. In order to deliver the pulse for a time T, it is required that switch 11 be closed by a period of time greater than T.

The voltage V of power supply 21 and the voltage $V_z$ across Zener diode 22 is chosen to give the desired voltages. It is possible to use a battery instead of a Zener diode.

Transistor 13 must handle the maximum load current and have a collector voltage rating greater than the voltage $V_z$. Bleeder resistor 24 is used if the maximum load current is very small. Resistor 24 is chosen depending on the maximum load current, the beta of transistor 13, and the magnitude of voltage E of power supply 15. Resistor 16 is determined by the beta of transistor 12 and the value of resistor 18.

Figure 3:
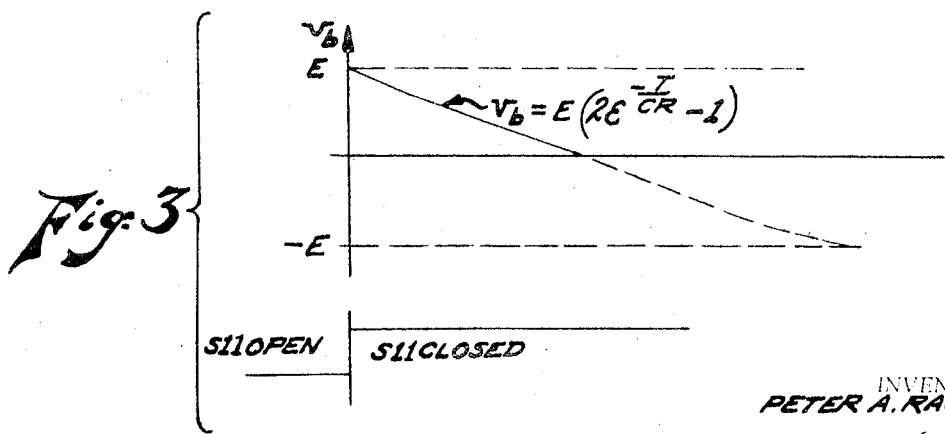
FIGURE 3 is a graph showing the relation between the closing of the switch and the voltage upon the base of a transistor employed in the illustrative embodiment.

The timing circuit operation is independent of resistor 19 which is necessary to protect the voltage source 15 when switch 11 is closed and also to limit the maximum charging current of capacitor 14 through base 10 of transistor 12 when switch 11 is open. The value of capacitor 14 is chosen to give the desired voltage versus time characteristics $V_b$ at base 10 of transistor 12 when switch 11 is closed as shown in FIGURE 3. This directly controls the width of the pulse on the voltage source 21 to load 23.

Switch 11 may be manually or cam operated depending on the pulse cycling desired. In special cases the circuit to the left of base 25 of transistor 13 as shown in FIGURE 1 can be replaced by a conventional monostable multivibrator such that the circuit could be triggered by a pulse. Or it may be replaced by a free running multivibrator if a periodic transient pulse is desired.

Depending on the choice of transistor 13, the duty cycling, and the operating temperature, it may be necessary to add a slight amount of positive bias to base 25 of transistor 13 when it is in the nonconducting state which would insure cutoff. For narrow pulses the rise time of the transistor should be considered. The circuit of this invention will operate for pulse width ranging from a few tenths of a millisecond to a few hundred milliseconds without considering some of the more subtle problems such as transistor rise time or required turn on base current.

What I claim is:
1. An apparatus for impressing a transient voltage upon a load comprising:
    (a) a direct voltage source connected to the load;
    (b) means for biasing the voltage source connected in series therewith;
    (c) a shorting transistor having a base, emitter, and collector, the emitter and collector being connected to the terminals of the biasing means for shorting the biasing means when the shorting transistor is in the conducting state; and
    (d) means for controlling the voltage of the emitter of the shorting transistor for switching the conduction state thereof, the voltage controlling means including:
        (1) a second transistor having a base, emitter, and collector, the collector being coupled to the base of the shorting transistor;
        (2) a resistor-capacitor circuit connected to the base of the second transistor;
        (3) a D-C power supply interposed between the resistor-capacitor circuit and the emitter of the second transistor; and
        (4) means for shorting the capacitor for switching the conduction state of the second transistor for a period of time depending upon the values of the resistor and the capacitor.
2. An apparatus for impressing a transient voltage according to claim 1 wherein the biasing means is a Zener diode.
3. An apparatus for impressing a transient voltage according to claim 1 wherein the capacitor shorting means is a cam operated switch.

(References on following page)

References Cited

UNITED STATES PATENTS

| | | | |
|---|---|---|---|
| 3,041,473 | 6/1962 | Piazza | 307—239 XR |
| 3,127,522 | 3/1964 | Thorndyke | 307—293 XR |

FOREIGN PATENTS

| | | |
|---|---|---|
| 127,712 | 4/1932 | Austria. |

ARTHUR GAUSS, Primary Examiner

STANLEY T. KRAWCZEWICZ, Assistant Examiner

U.S. Cl. X.R.

307—253, 239, 293; 328—67, 100